United States Patent

[11] 3,600,893

| | | |
|---|---|---|
| [72] | Inventor | Bernard C. Hudgens<br>West Lafayette, Ind. |
| [21] | Appl. No. | 11,408 |
| [22] | Filed | Feb. 16, 1970 |
| [45] | Patented | Aug. 24, 1971 |
| [73] | Assignee | TRW Inc.<br>Cleveland, Ohio |

[54] HYDRAULIC DEVICE HAVING PRESSURE DAM VALVE MEANS
10 Claims, 10 Drawing Figs.

[52] U.S. Cl. .................................... 60/52 S, 91/467
[51] Int. Cl. .................................... F15b 15/18
[50] Field of Search .................................... 60/52 S; 91/467; 180/79.2

[56] References Cited
UNITED STATES PATENTS

| | | | |
|---|---|---|---|
| 3,246,472 | 4/1966 | Kries | 60/52 S |
| 3,443,378 | 5/1969 | Monroe et al. | 60/52 S |
| 3,452,543 | 7/1969 | Goff et al. | 60/52 S |
| 3,481,147 | 12/1969 | Goff | 60/52 S |

Primary Examiner—Edgar W. Geoghegan
Attorney—Hill, Sherman, Meroni, Gross & Simpson ABSTRACT: A manually actuated hydraulic meter-pump device for controlling the operation of a hydraulic servomotor. The device includes a cylindrical sleeve valve carried for axial and rotational movement in a bore wall. The sleeve valve is shifted axially in opposite directions to provide movement of the servomotor in opposite directions and comprises a series of axially spaced circumferential lands and grooves which cooperate with a series of similar lands and grooves in the bore wall to control the flow of fluid through the device. Since the fluid pressure in adjacent grooves may be unequal some of the grooves are arranged to serve as pressure dams to reduce parasitic leakage between the sleeve valve and bore wall. To this end the pressure dam grooves are connected by conduits to high-pressure grooves and poppet-type valves are mounted in the conduits to establish flow therethrough when their respective pressure dam grooves are serving as pressure dams and to block flow therethrough at other times.

INVENTOR
BERNARD C. HUDGENS

ATTORNEYS

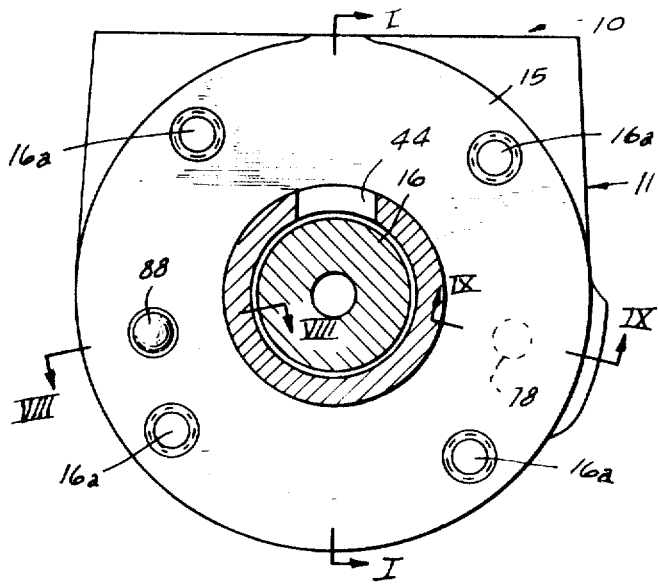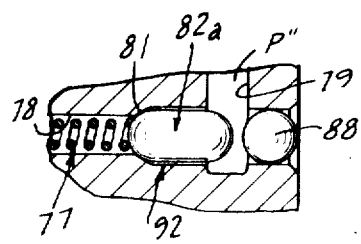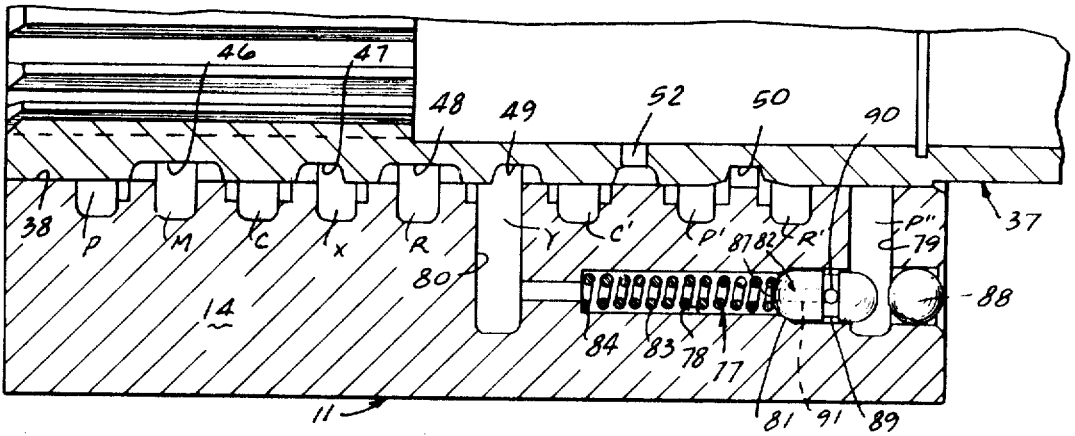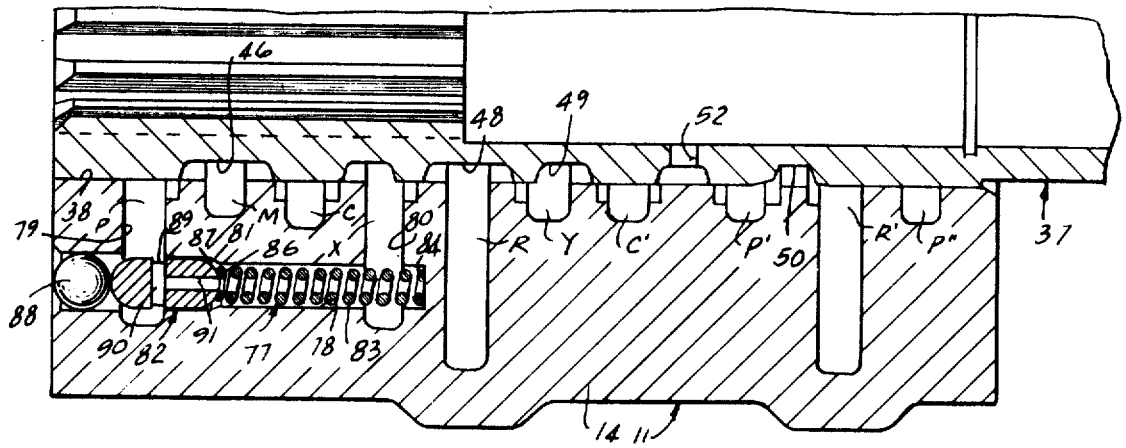

HYDRAULIC DEVICE HAVING PRESSURE DAM VALVE MEANS

BACKGROUND OF THE INVENTION

This invention relates generally to the field of hydraulic devices for controlling the operation of hydraulic servomotors and more particularly to such devices incorporating a circumferential groove sleeve valve movable in a cylindrical bore.

Hydraulic devices of this general description are known in the prior art. In some arrangements wherein the fluid pressure in adjacent circumferential grooves, under all or under some operating conditions, is unequal, certain of the grooves, which may be referred to as pressure dam grooves, are interposed between adjacent grooves and subjected to high-pressure fluid to reduce parasitic leakage of fluid across the adjacent grooves and between the peripheral wall of the sleeve valve and the wall of the bore.

In some known arrangements the pressure dam may also serve as fluid transfer grooves to transfer fluid between its adjacent grooves under certain operating conditions. It is then, of course, desirable to reduce the open communication of the pressure dam groove with the source of high-pressure fluid since otherwise the high-pressure fluid will prevent proper transfer of the lower pressure fluid.

In the past it has been known to provide a conduit between a pressure dam groove and a high-pressure groove and to provide an within the conduit to pressurize the pressure dam groove when it is serving as a pressure dam but to reduce fluid flow from the high-pressure groove to the pressure dam groove when it is serving as a transfer groove.

While the use of an orifice has enhanced the operation of devices so equipped nevertheless the fluid flow through the orifice when the pressure dam groove is serving as a transfer groove has still been sufficient under operating conditions to render the degree of control of the associated servomotor less suitable.

SUMMARY OF THE INVENTION

The present invention overcomes the deficiencies of the prior art by providing simple yet effective means of establishing flow between the high-pressure groove and pressure dam groove for purposes of pressurization when the latter groove is being utilized as a pressure dam and of positively blocking flow when the pressure dam groove is being utilized as a fluid transfer groove.

In a preferred embodiment of the invention said means comprises a poppet-type check valve in the conduit which communicates the high-pressure groove and the pressure dam groove. A valve seat formed in the conduit faces the high-pressure groove and a valve member is movable toward and away from the valve seat and is spring biased to an unseated position.

When the pressure dam groove is being utilized as a fluid transfer groove the high-pressure differential between the high-pressure groove and the pressure dam groove is sufficient to overcome the bias of the spring and seat the valve member, thereby positively blocking fluid flow through the conduit.

When the pressure dam groove is being utilized as a pressure dam, however, the pressure between the high-pressure groove and the pressure dam groove is substantially equal, thereby permitting the spring to unseat the valve member.

The valve member and the wall of the conduit are arranged to form a fluid flow passageway through the valve member or otherwise across the valve seat when the valve member is unseated, thereby providing direct fluid communication between the high-pressure groove and the pressure dam groove.

It is, therefore, an object of the present invention, to provide direct fluid communication between the high-pressure groove and the pressure dam groove when the pressure dam groove is serving as a pressure dam but to positively block flow between the two grooves when the latter is serving as a fluid transfer groove.

Other objects are to reduce parasitic fluid leakage across adjacent grooves in the sleeve valve, to increase the level of control of the servomotor and to obtain the foregoing goals in a most simple, inexpensive yet entirely effective manner.

In addition to the foregoing many other features, advantages and additional objects of the present invention will become manifest to those versed in the art upon making reference to the detailed description which follows and to the accompanying sheets of drawings in which a preferred structural embodiment incorporating the principles of the present invention is shown by way of illustrative example.

BRIEF DESCRIPTION OF THE DRAWING

FIG. 5 is a view showing in elevation a driving connection between a pair of relatively movable members of the device shown in FIG. 1 and is taken substantially along lines V-V of FIG. 1.

FIG. 6 is similar to FIG. 5 but discloses means for providing relative axial movement of the two relatively movable members and is taken substantially along lines VI-VI of FIG. 1.

FIG. 7 is a sectional view taken along lines VII-VII of FIG. 1.

FIGS. 8 and 9 are enlarged fragmentary longitudinal sectional views of the device shown in FIG. 1 taken substantially along lines VIII-VIII and IX-IX of FIG. 7.

FIG. 10 is similar to FIG. 8 but shows another embodiments of a valve member of the invention.

DESCRIPTION OF THE PREFERRED EMBODIMENT

Figure 1:
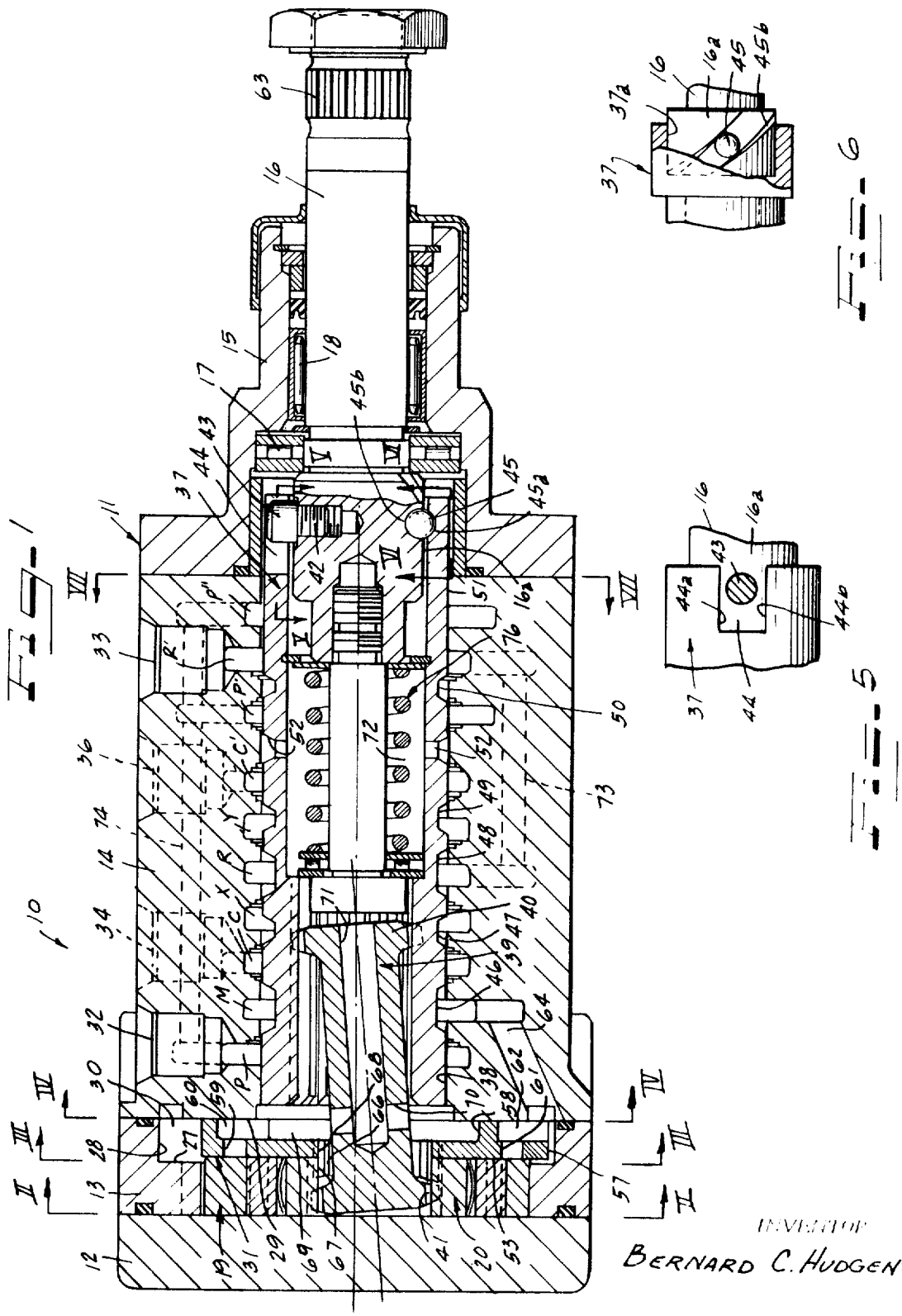
FIG. 1 is a longitudinal cross-sectional view of a hydraulic device incorporating the principles of the present invention.

The principles of the present invention may be utilized in any hydraulic device incorporating a grooved sleeve valve in which at least one of the grooves serves both as a pressure dam groove and as a fluid transfer groove. The invention finds particular utility, however, in hydraulic devices for controlling the operation of a hydraulic servomotor and in an embodiment thereof herein illustrated comprises a servomotor control mechanism useful, for example, in controlling the power cylinder in a hydrostatic vehicular power steering system.

While hydraulic device disclosed herein, indicated generally in the drawings at reference numeral 10, finds special utility in vehicular power steering systems it may also be utilized as a primary control mechanism in controlling the operation of numerous hydraulically operated servomotors.

Figure 2:
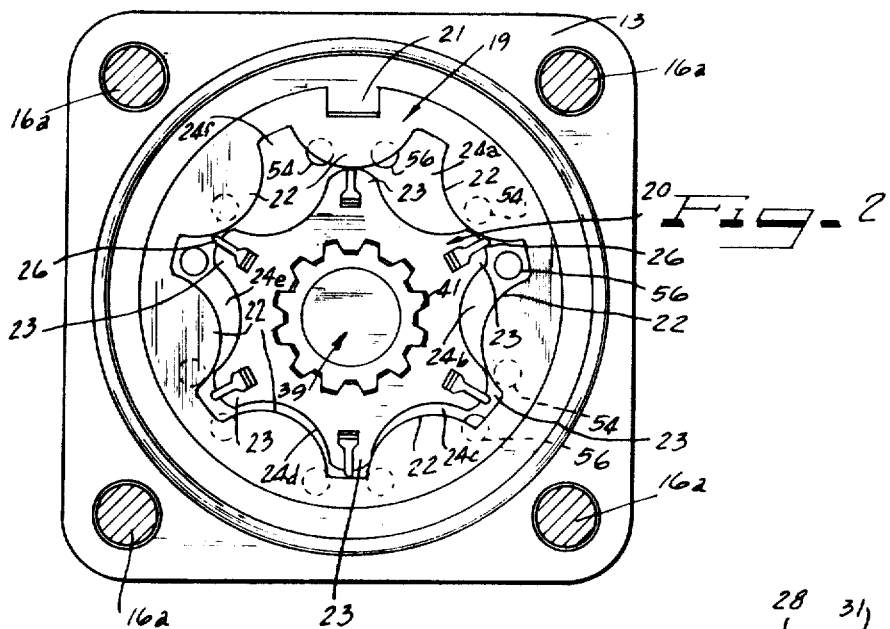
FIGS. 2-4 are cross-sectional views of the device shown in FIG. 1 and are taken respectively substantially along lines II-II, III-III and IV-IV of FIG. 1.
Figure 3:
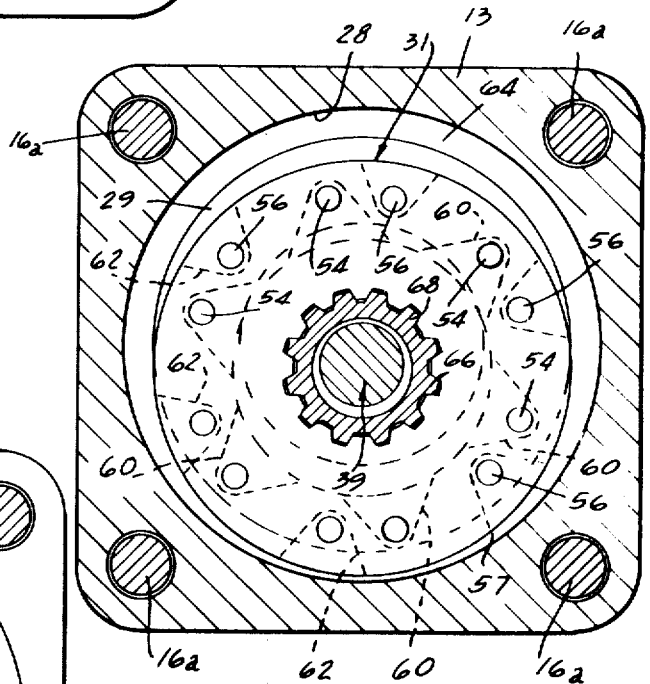
Figure 4:
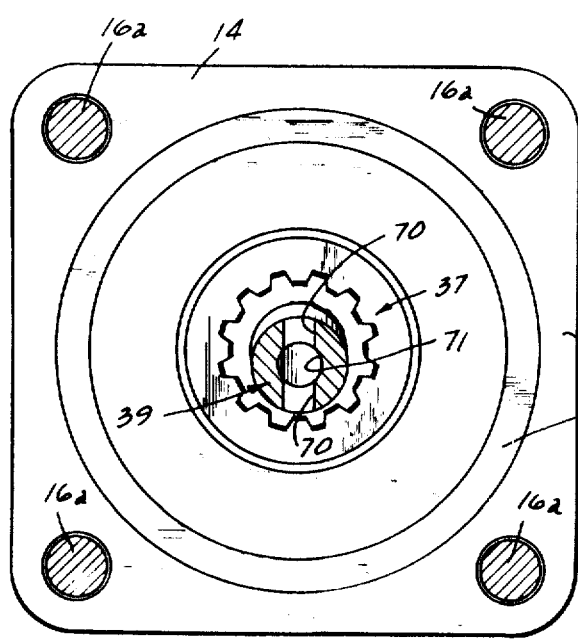

The device 10 comprises a housing 11 consisting essentially of four sections indicated respectively at reference numerals 12, 13, 14 and 15. The housing sections 12-15 are clamped together in fixed assembly by virtue of a plurality of assembly bolts as indicated in FIGS. 2-4 at reference numerals 16a.

Section 12 closes off one end of the housing 11 and section 15 closes the other end but also serves to mount a work input-output shaft 16. The shaft 16 is supported in the housing section 15 by virtue of bearing assemblies 17 and 18 and the axis of rotation of the shaft 16 coincides with a longitudinal axis of the entire housing 11.

The housing section 13 is shaped substantially in the form of an annular ring and disposed within the axial confines thereof are a pair of fluid displacement gear members including a stator indicated at reference numeral 19 and a rotor indicated at reference numeral 20. The stator is keyed stationarily to the housing section 13 as indicated at reference numeral 21 and comprises a series of internal lobes or teeth 22 which engage in meshing relation with a series of external lobes or teeth 23 formed on the rotor 20. In the embodiment illustrated the stator 19 has a total of seven teeth 22, whereas the rotor 20 has only six teeth 23. As a consequence of this differential as well as the construction and arrangement of the teeth, the gear members are movable simultaneously orbitally and rotationally relative to one another.

In the embodiment illustrated the stator 19 is fixed, and consequently the rotor 20 will move both orbitally and rotationally relative to the stator 19 upon operation of the device 10.

Between the teeth 22 of the stator 19 and the teeth 23 of the rotor 20 are formed a plurality of fluid pockets indicated at reference characters 24a–24f. As the rotor 20 moves relative to the stator 19 the fluid pockets 24a–24f alternately expand and contract. Thus, during any moment of operation some of the fluid pockets are expanding whilst others are contracting, as is understood by those skilled in the art. A radially outwardly biased vane 26 is mounted on each of the rotor teeth 23 to reduce leakage between the adjacent fluid pockets 24a–24.

In addition to providing a housing for gear members 19 and 20 the housing section 13 also has formed therein a radial wall 27 and a circumferential wall 28 which, in part and together with a radial wall 29 formed at one end of the housing section 13, provide a chamber 30 in which is housed a fluid commutator valve indicated generally at reference numeral 31. The function of the commutator valve 31 is to direct fluid into and out of the expanding and contracting fluid pockets 24a–24f in timed relation to the relative orbital and rotational, movement of the fluid displacement members 19 and 20.

A pair of fluid connections 32 and 33 are formed in the housing section 14 and communicate through suitable fluid circuitry with the commutator valve 31. When the device 10 is being utilized as a servomotor controller in a power steering system or the like, the fluid connection 32 may be connected to the discharge or high-pressure side of a main power fluid pump, whereas the connection 33 may be coupled to the suction side of the pump or to the fluid reservoir located on the suction side of the pump.

Also formed in the housing section 14 are a pair of work-cylinder fluid connections indicated respectively at reference numerals 34 and 36. These latter two connections may be coupled to the opposite ends of a servomotor such as, for example, the main hydraulic cylinder in a vehicular power steering system.

In addition to the commutator valve 31, the illustrated hydraulic device 10 also includes a directional control fluid valve indicated generally at reference numeral 37. The purpose of valve 37 is to control the direction of fluid flow between the fluid connections 32, 33 and through the fluid displacement gear members 19 and 20 and also to control the direction of flow into and out of the work-cylinder fluid connections 34 and 36.

The directional control valve 37 is tubularly shaped and resides within a cylindrical bore in the housing section 14 formed by a bore wall 38 which is aligned axially with the work input-output shaft 16 as well as the stator 19. The valve 37 is coupled to the rotor 20 for joint rotation by means of an intermediate shaft part or wobble shaft 39 which is splined at one end 40 to the directional control valve 37 and at an opposite end 41 to the rotor 20. The valve 37 is also connected to the work input-output shaft 16 for relative axial and rotational movement.

Referring to FIGS. 1, 5 and 6, a threaded stud 42 is threaded radially into the shaft 16 and an enlarged head 43 thereof is disposed in an oversized slot 44 formed in the control valve 37. In addition a ball 45 resides in a semispherical recess 45a formed in an inner wall 37a of the valve 37 and extends in a complementarily shaped helical groove 45b formed in a circumferential wall 16a of the shaft 16.

As the shaft 16 is rotated relative to the valve 37 the valve will shift axially, in a direction depending upon the direction of relative rotation, as a consequence of the ball 45 riding in the helical groove 45b. However, in the event that the shaft 16 rotates relative to the valve 37 beyond a given degree then the head 43 of the stud 42 will abut a sidewall 44a or 44b of the slot 44, whereupon further rotation of the shaft 16 will cause the valve 37 to be driven thereby.

In order to enable the control valve 37 to perform its directional control function the bore wall 38 is provided with a series of grooves indicated respectively at P, M, C, X, R, Y, C', P', R' and P''. The aforesaid grooves correspond with another series of grooves 46–50 formed in a peripheral wall 51 of the control valve 37 and a pair of radial passages or bores 52 and 52' which extend through the cylinder wall of the control valve 37. The function of the various grooves and passages identified above will be explained in detail hereinafter.

The commutator valve 31 is essentially disc shaped and comprises a flat radial wall 53 which is aligned and in abutting engagement with the adjacent end walls of the stator 19 and the rotor 20. Formed in the radial wall 53 are a plurality of ports. The ports are grouped in pairs, one port of each pair being identified at reference numeral 54 and the other port of each pair being identified at 56. The pairs of ports are spaced radially angularly about the central axial of the commutator valve 31 and furthermore the ports 54 and 56 of each pair o are also mutually angularly spaced. There are six pairs of ports, and thus the number of pairs corresponds to the number of teeth of the rotor 20. With respect to the rotor teeth, and as viewed in FIG. 2, the port 54 is on one radial side of its respective rotor tooth whereas the port 56 is on open radial side of its respective rotor tooth whereas the port 56 is on the opposite side. The circular pattern in which the ports 54 and 56 are arranged has diameter which corresponds substantially to the pitch diameter of the stator teeth 22 and is such that the ports are closed or sealed as they move into axial alignment with the stator teeth 22 and are unsealed or opened for fluid communication and move into axial alignment with the fluid pockets 24a–24f between the teeth of the stator 19.

The commutator valve 31 also comprises an outer peripheral wall 57 having a diameter which is less than the diameter of the adjacent cylindrical wall 28, and an inner peripheral wall 58. The ports 54 communicate with the inner peripheral wall 58 a through a series of axial passages 59 and radial passages 60 whereas the ports 56 communicate with the outer peripheral wall 57 through axial passages 61 and radial passages 62. As a consequence the chamber 30 in which the commutator valve 31 resides is partitioned into two subchambers, one of which surrounds the commutator valve 31 and the other of which is formed within the commutator valve 31.

In order to more clearly explain the operation of commutator valve 31 and its relation to the other components the operation of the device 10 may be described as follows.

Assuming that the device 10 is being used in a vehicular power steering system, the outboard end of the shaft 16 may be splined as at 63 to receive a conventional vehicular steering wheel. Assuming that no torque is being applied to the shaft 16 the control valve 37 is axially disposed in a center or neutral position, the position thereof shown in FIG. 1. In that position the pressurized fluid from the discharge side of the main power fluid pump is connected to the fluid connection 32 but is blocked off at groove P by the valve 37. Consequently, there is no turning effect whatsoever on the dirigible wheels of the vehicle when the shaft 16 is in a static condition.

Assume, however, that the shaft 16 is turned in a clockwise direction. The rotor 20, and thus the control valve 37, is hydraulically locked against rotation and thus, as a consequence of the relative rotation of the shaft 16 and the valve 37, the valve is shifted axially leftwardly as viewed in FIG. 1.

When the valve 37 shifts axially, the pressure groove P communicates through groove 46 with the meter groove M, and then communicates through a passage 64 formed in the housing section 14 a with the chamber 30 in which the commutator valve 31 is housed. Pressurized fluid then flows through passages 62 and 61 to the ports 56.

Certain of the ports 56 (not covered by stator teeth 22) communicate with corresponding ones of the fluid pockets 24a–24f. Pressurization of these fluid pockets causes movement of the rotor 20 both orbitally and rotationally relative to the stator 19.

The commutator valve is connected for joint movement to the rotor 20 by means of a tubular coupling 66 which is splined at 67 to the rotor 20 and splined at 68 to the commutator valve 31. As the rotor 20 simultaneously orbits and rotates, the fluid pockets 24a–24f which are then contracting, open to the ports 54 which correspond thereto. The fluid being delivered from the fluid pockets passes through the ports 54 and thence through the passages 59 and 60 and into an aperture 69 formed within the inner peripheral wall 58 of the commutator valve 31.

The fluid then flows through passages 70 formed in the wobble shaft 39 and thence through a longitudinal passage 71 into a hollow portion 72 of the directional control valve 37.

From the hollow 72 the fluid flows through radial passages 52 and 52' into the servomotor or working groove C', and thence to the fluid connection 36 which may be connected to one end of a hydraulic work cylinder to urge the piston member thereof in one direction. The fluid being expelled from the opposite end of the work cylinder is directed to fluid connection 34, from which it flows into the servomotor groove C and thence through groove 47 into the pressure dam groove X. From groove X, the fluid flows through groove 48 and into the return or low-pressure groove R, which communicates with the second low-pressure groove R' via an internal passage 73 formed in the housing section 14. From the groove R' the fluid flows out the fluid connection 33 and back to the a main power fluid pump.

When the steering shaft 16 is rotated in an opposite direction from that just assumed the directional control valve 37 is shifted rightwardly as viewed in FIG. 1 to close off high-pressure groove as shown. The second high-pressure groove P', however, communicates with groove P via an internal passage 74 formed in the housing section 14. Thus, groove P' is always under the same high pressure as groove P. As the valve 37 shifts rightwardly groove P' communicates through radial passages 52 and 52' into the hollow 72 of the control valve 37 from which it flows through the bore 71 of the wobble shaft 39 and into the aperture 69 of the commutator valve 31.

The pressurized fluid thus flows out of ports 54 and into the expanding pockets and the fluid from the contracting pockets is expelled through the ports 56 and thence into the chamber 30 surrounding the commutator valve 31.

Continuing with the flow path, the fluid flows through the passage 64 and into the meter groove M, from which it flows via groove 46 into the adjacent servomotor groove C. From groove C the pressurized fluid flows from the fluid connection 34 to said opposite end of the hydraulic servomotor or work cylinder. The fluid expelled from the opposite end flows to fluid connection 36 and the second servomotor groove C', from which it flows through the groove 49 and into pressure dam groove Y, and then through groove 48 into the low pressure groove R. From groove R the fluid flows through passageway 73, thence into the second low pressure groove R' and to the fluid outlet connection 33 back to the suction side of the main power fluid pump.

Upon termination of the turning torque on the shaft 16 the control valve 37 is biased to its neutral or "shut-off" position (the position shown in FIG. 1) by virtue of a spring arrangement indicated generally at reference numeral 76. The spring arrangement 76 provides a neutral bias to the valve 37 regardless of the direction of axial shifting of the valve and the direction of rotation of the shaft 16.

Referring to FIGS. 8 and 9 it is noted that groove X serves as a fluid transfer groove to convey fluid from groove C to groove R when the sleeve valve 37 is moved to its leftward operating position as viewed in those figures. When the sleeve valve 37 is in a neutral position, however, and more importantly when it is shifted rightwardly to its opposite operating position the groove X no longer serves as a transfer groove but instead is pressurized to serve as a hydraulic pressure dam between the higher pressure groove C and the lower pressure groove R, to thereby reduce parasitic fluid leakage across grooves C and R between the peripheral wall 51 of the sleeve valve 37 and the bore wall 38.

To that end and as shown in FIGS. 7 and 9 the pressure dam groove X is connected to the high-pressure groove P by means of a conduit or conducting passageway 77 formed in section 14 of the housing 11. The conduit 77 is formed by means including an axially extending conduit wall 78 and a pair of radially extending conduit walls 79 and 80.

The wall 78 forms an annular valve seat 81 which faces upstream or toward the high-pressure groove P. Disposed within the wall 78 adjacent the valve seat 81 is a poppet-type valve member 82 movable into and out of seating engagement with the valve seat 81. Also disposed within the conduit wall 78 but on the side of the valve seat 81 opposite the valve member 82 is a helical spring 83 which is bottomed at one end 84 on the conduit wall 80 and at an opposite end 86 on an end wall 87 of the valve member 82. The spring 83 biases the valve member 82 toward an unseated position with respect to the valve seat 81. A a ball member 88 utilized as a seal to plug the end of conduit wall 78 in the housing section 14 also serves as an abutment for the valve member 82 in the unseated position thereof.

The conduit wall 78 and the valve member 82 are cylindrically shaped and in sliding relatively leakage-free relation with one another. Formed within the valve member 82 is an annularly shaped circumferentially continuous groove 89 which communicates with a transverse aperture 90 and an axially extending aperture 91 opening to the end wall 87 of the valve member 82. The groove 89 is disposed so as to be closed off from communication with the high-pressure groove P when the valve member 82 is in a seated position and open to groove P when the valve is unseated.

When the directional control sleeve valve 37 is shifted to its leftward operating position and the pressure dam groove X functions as a transfer groove for transferring fluid from the servomotor groove C to the low pressure groove R, the relatively high-pressure differential between grooves P and X causes the valve member 82 to be moved against the opposite bias of spring 83 to a seated position. At this position communication between grooves P and X are positively blocked off except for any nominal leakage which may exist across the valve seat 81.

When, however, the sleeve valve 37 is moved to its rightward operating position the pressure dam groove X no longer directly communicates with grooves C and R and instead performs the function of a hydraulic pressure dam therebetween.

Since the relatively high-pressure differential between grooves P and X no longer obtains, the spring 83 unseats the valve 82. In the unseated position of the valve 82 fluid communication between grooves P and X is established through apertures 90 and 91 of the valve member 82.

Referring to FIG. 8 a similar poppet-type valve arrangement communicates pressure dam groove Y and the third high pressure groove P''. In the latter arrangement, however, wherein parts similar to those shown in FIG. 9 are designated by similar reference numerals, the direction in which the valve seat 81 faces, and the direction in which the spring 83 biases the valve member 82, is opposite that shown in FIG. 9 but is still in the direction of the high pressure groove P'' to provide blockage between the high pressure groove P'' and the pressure dam groove Y when the pressure dam groove Y is serving as a fluid transfer groove, and for establishing communication between the high-pressure and pressure dam grooves P'' and Y when the groove Y is serving as a pressure dam between grooves R and C'.

While a barrel-shaped poppet-type valve 82 is illustrated herein other types of valving arrangements such as mushroom-headed poppet valves may also be suitable. Furthermore apertures corresponding to apertures 90 and 91 may be formed in conduit wall 78 or otherwise in the housing port 14 so long as communication therethrough is blocked in the seated position of the valve member and unblocked in the unseated position of the valve member.

For example, FIG. 10 discloses another embodiment of a valve member, indicated at reference numeral 82a, which is similar to valve 82 shown in FIG. 8 but which is of solid configuration rather than apertured. The diameter of a peripheral wall 92 of the valve member 82a is slightly less than the diameter of the wall 78 in which it resides to provide a fluid flow path therebetween.

Thus in the unseated position of the valve member 82a the grooves Y and P'' are in communication with one another, whereas in the seated position thereof the valve member blocks off communication between the latter two grooves.

Although minor modifications might be suggested by those versed in the art, it should be understood that we wish to embody within the scope of the patent warranted hereon all such modifications as reasonably come within the scope of our contribution to the art.

What I claim is:

1. In a hydraulic device including a housing, fluid openings formed in the housing including a high-pressure port, a low-pressure port and a pair of servomotor ports, a bore wall in the housing forming a cylindrical bore communicating with the fluid openings, a cylindrical sleeve valve carried within the bore, means for selectively axially shifting the valve in the bore and complementarily arranged axially spaced circumferential lands and grooves formed of the bore wall and the peripheral wall of the sleeve valve for communicating different ones of the axially spaced grooves with one another as the valve is shifted in opposite directions between first and second positions, a first of said grooves communicating with a second groove in said first position of the valve and serving as a fluid flow passageway and means forming a conduit constantly communicating said first groove with a third groove to pressurize said first groove to reduce parasitic fluid leakage thereacross between axially adjacent grooves in said second position of the valve, the improvement comprising valve means associated with said conduit for blocking fluid flow between said first and third grooves in said one position of said sleeve valve and for establishing relatively free fluid flow with low-pressure loss between said first and third grooves in said second position of said sleeve valve.

2. The invention as defined in claim 1 wherein said valve means comprises
means forming a valve seat in said conduit and
a valve member movable into and out of seating engagement with said valve seat.

3. The invention as defined in claim 1 wherein said valve means comprises
means forming a valve seat in said conduit,
a valve member movable into and out of seating engagement with said valve seat, and
means tending to bias said valve member away from said valve seat.

4. The invention as defined in claim 1 wherein said valve means comprises
means forming a valve seat in said conduit,
a valve member movable into and out of seating engagement with said valve seat, and
fluid flow passage means formed by said conduit and by said valve member for establishing fluid flow through said conduit and across said valve member when the valve member is unseated and for blocking flow across said valve member when said valve member is seated.

5. The invention as defined in claim 1 wherein the fluid pressure differential between said first and third groove is greater than in said first position of said sleeve valve than in said second position thereof.

6. The method of reducing parasitic leakage between first and second axially spaced circumferentially extending grooves maintained at different fluid pressures and formed in the peripheral wall of a sleeve valve which is shiftable axially between first and second positions and which has formed therein a third groove interposed between the first and second grooves for connecting the first and second grooves in the first position of the valve and for providing a fluid pressure dam between the first and second grooves in the second position of the sleeve valve, comprising the steps of communicating the third groove with a source of a fluid at a higher pressure than the pressure of said first and second grooves when said sleeve valve is shifted to the second position thereof, and completely blocking off the third groove from said fluid source when the sleeve valve is shifted to the first position thereof.

7. Apparatus for reducing parasitic leakage between first and second axially spaced circumferentially extending grooves maintained at different fluid pressures and formed in the peripheral wall of a sleeve valve which is shiftable axially between first and second positions and which has formed therein a third groove interposed between the first and second grooves for connecting the first and second grooves in the first position of the valve and for providing a fluid pressure dam between the first and second grooves in the second position of the sleeve valve, comprising means for communicating the third groove with a source of fluid at a higher pressure than the pressure of said first and second grooves when said sleeve valve is shifted to the second position thereof, and means for completely blocking off the third groove from said fluid source when the sleeve valve is shifted to the first position thereof.

8. A hydraulic manually operated fluid meter-pump device for use in association with a hydraulically operated servomotor comprising a housing having a bore wall forming a cylindrical bore therein and a high-pressure port, a low-pressure port and a pair of servomotor ports a communicating with said bore, fluid meter-pump means including a pair of relatively rotatable fluid displacement members communicating with said bore, a rotatable shaft connected to said fluid meter-pump means for joint rotation therewith, means forming a series of cooperating lands and grooves in said bore wall and in the peripheral wall of said sleeve valve for controlling the flow of l fluid between said ports and through said fluid displacement means in response to axial movement of said sleeve valve between first and second positions, said grooves comprising, in order, a first pressure groove, a meter groove, a first servomotor groove, a first pressure dam groove, a first return groove, a second pressure dam groove, a second servomotor groove, a second pressure groove, a second return groove and a third pressure groove, first and second conduit means communicating respectively said first pressure groove with said first pressure dam groove and said third pressure groove with said second pressure dam groove, and poppet-type valve means in said first and second conduits for blocking flow in said first conduit and establishing flow in said second conduit in said first position of said sleeve valve and for blocking in said second conduit and establishing flow in said first conduit in said second position of said sleeve valve.

9. The invention as defined in claim 8 wherein said poppet-type valve means further comprises, in each of said first and second conduits,
a valve seat facing the corresponding pressure groove,
a valve member movable into and out of seating engagement with said valve seat, and
spring means biasing said valve member toward an unseated position.

10. The invention defined in claim 9 and including
means forming in association with each valve member an aperture communicating the opposite sides of its respective conduits across its respective valve seat in the unseated position of its valve member and for blocking communication thereacross in the seated position of the valve member.

UNITED STATES PATENT OFFICE
CERTIFICATE OF CORRECTION

Patent No. 3,600,893                 Dated August 24, 1971

Inventor(s) BERNARD C. HUDGENS

It is certified that error appears in the above-identified patent and that said Letters Patent are hereby corrected as shown below:

Column 1, line 30, after "an" insert --orifice--.
Column 2, line 32, change "embodiments" to "embodiment".
Column 3, line 15, change "24a-24" to "24a-24f".
Column 4, lines 24-25, after "on" (line 24) erase "open radial side of its respective rotor tooth whereas the port 56 is on".
Column 4, line 27, after "has" insert --a--.
Column 4, line 37, after "58" erase "a".
Column 5, line 32, after "groove" (1st occurrence) insert --P--.
Column 6, line 19, after "A" erase "a".
Column 7, line 25, after "formed" erase "of" and insert --in--.
Column 7, line 64, after "third" erase "groove" and insert --grooves--.
Column 7, line 65, after "greater" erase "than".
Column 8, line 6, after "of" erase "a".
Column 8, line 31, after "ports" erase "a".
Column 8, line 38, after "of" erase "1".
Column 8, line 53, after "blocking" insert --flow--.
Column 8, line 67, before "across" erase "conduits" and insert --conduit--.

Signed and sealed this 23rd day of May 1972.

(SEAL)
Attest:

EDWARD M. FLETCHER, JR.              ROBERT GOTTSCHALK
Attesting Officer                     Commissioner of Patents